United States Patent [19]

Durenec

[11] Patent Number: 4,472,863
[45] Date of Patent: Sep. 25, 1984

[54] ADJUSTING PLATE RETAINER

[75] Inventor: Peter Durenec, Annandale, Va.

[73] Assignee: The United States of America as represented by the Secretary of the Army, Washington, D.C.

[21] Appl. No.: 362,417

[22] Filed: Mar. 26, 1982

[51] Int. Cl.³ .................. A44B 21/00; F16L 37/00
[52] U.S. Cl. .................................. 24/498; 24/24; 24/506; 192/93 B; 285/409
[58] Field of Search ............. 24/248 R, 248 E, 248 B, 24/263 B, 263 CA, 274, 24, 67 R; 285/312, 409, 411; 192/93 B; 33/148 G

[56] References Cited

U.S. PATENT DOCUMENTS

| | | | |
|---|---|---|---|
| 716,472 | 12/1902 | Pilcher | 24/248 R |
| 740,664 | 10/1903 | Kroll | 285/409 |
| 1,377,116 | 5/1921 | Delcourt | 24/248 E |
| 1,455,596 | 5/1923 | Morrison | 24/248 E |
| 1,646,463 | 10/1927 | Stokesberry | 285/409 |
| 1,772,395 | 8/1930 | Iseman | 24/248 E |
| 2,398,962 | 4/1946 | Randrup | 24/248 E |
| 2,654,629 | 10/1953 | Renfroe | 24/248 R |
| 2,932,873 | 4/1960 | Reichert | 24/248 R |
| 3,159,393 | 12/1964 | Villano | 24/263 B |
| 3,568,270 | 3/1971 | Saburo Ida et al. | 24/248 R |
| 3,828,403 | 8/1974 | Perrin et al. | 285/409 |

FOREIGN PATENT DOCUMENTS 892891  5/1944  France .................. 24/67 R

Primary Examiner—Victor N. Sakran
Attorney, Agent, or Firm—Anthony T. Lane; Milton W. Lee; Aubrey J. Dunn

[57] ABSTRACT

A generally semicircular device is disclosed which is capable of holding an adjusting knob or wheel stationary with respect to a flange. The device is in the form of a hollow arch with flat parallel walls joined by a curved wall. A cam lever is pivoted in an opening in one of the flat walls such that the cam bears against the knob for one position of the lever and pushes the knob and flange towards each other.

1 Claim, 4 Drawing Figures

ADJUSTING PLATE RETAINER

The invention described herein may be manufactured, used, and licensed by the U.S. Government for governmental purposes without the payment of any royalties thereon.

BACKGROUND OF THE INVENTION

The invention is in the field of adjusting plate retainers, and is particularly useful for retaining the adjusting plates on the U.S. Army boresight collimater SU-93/TAS. This collimater, as currently made, requires partial disassembly for adjusting its various modes of operation. Since the collimater is normally purged with dry nitrogen after assembly, repurging becomes necessary. The collimater is thus not field adjustable, but must be sent to a maintenance depot for adjustment. Naturally, this takes the collimater out of service while it is being adjusted. The instant invention allows easy field adjustment without loss of purging.

SUMMARY OF THE INVENTION

An adjustment plate retainer for retaining the adjustment plate fixed both in rotation and translation with respect to a flange. The retainer includes two flat, parallel, and arciform side plates joined by a curved arciform plate orthogonal to the side plates. Additionally, one of the side plates is pierced for a cam lever. In use, the retainer is placed such that the adjustment plate and the flange are between the retainer side plates. The cam lever is then operated to press the flange and adjustment plate together. When it is desired to adjust the adjustment plate, the cam lever is operated to release pressure between the adjustment plate and the flange.

DESCRIPTION OF PREFERRED EMBODIMENT

Figure 1:
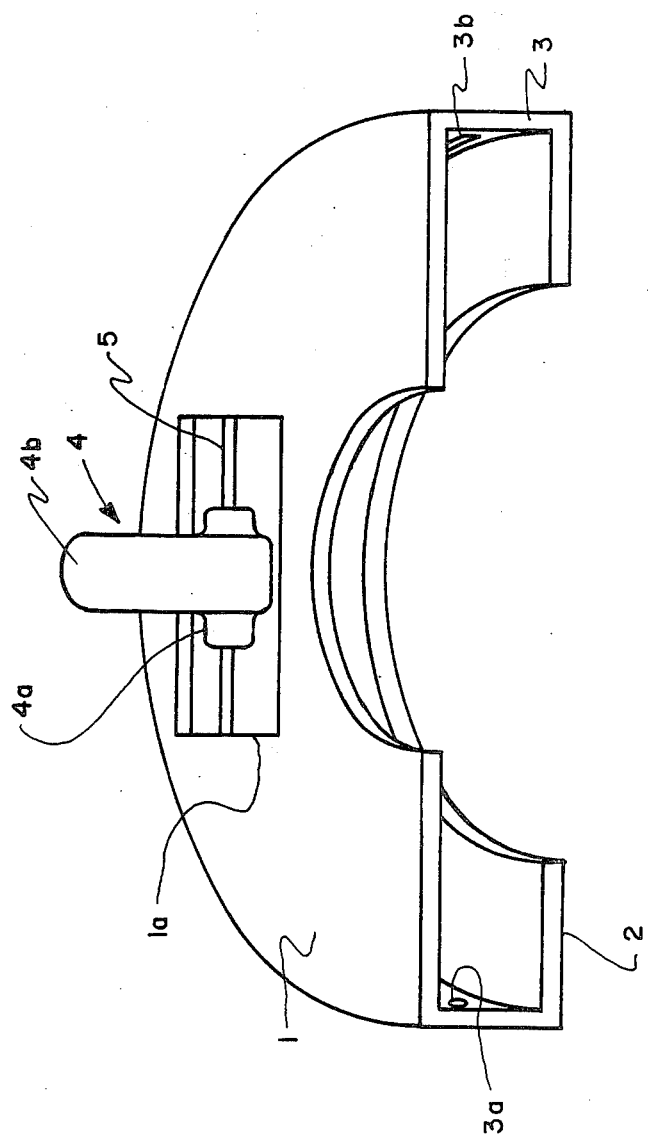
FIG. 1 shows a pictoral view of the invention.
Figure 3:
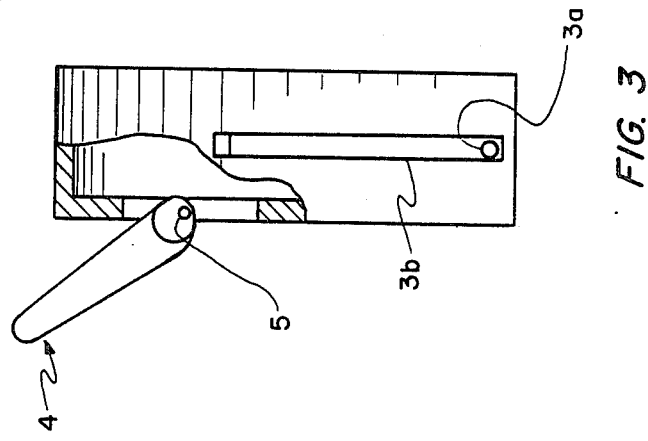
FIG. 3 is an end plan view of the invention.
Figure 2:
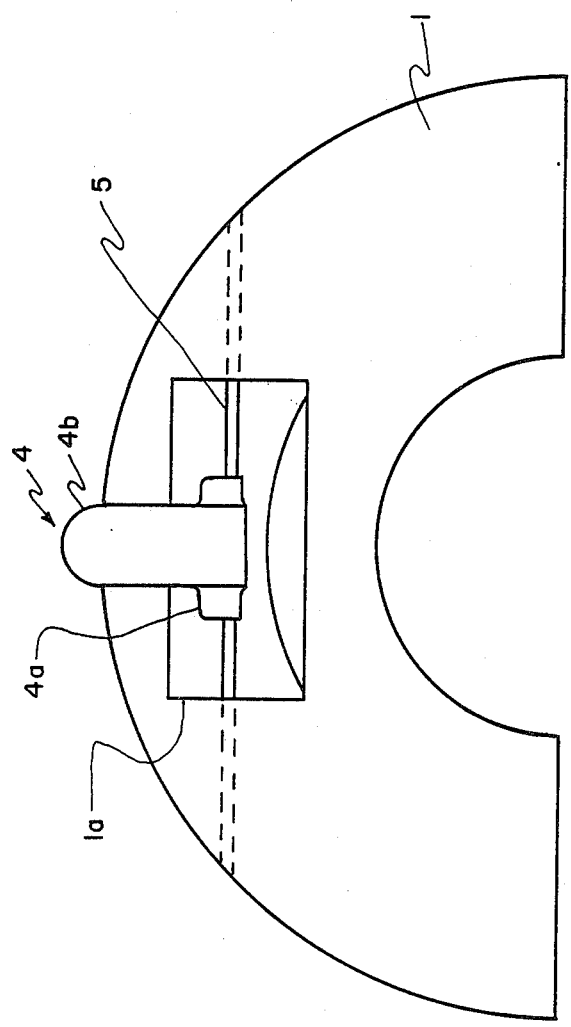
FIG. 2 is a top plan view of the invention.
Figure 4:
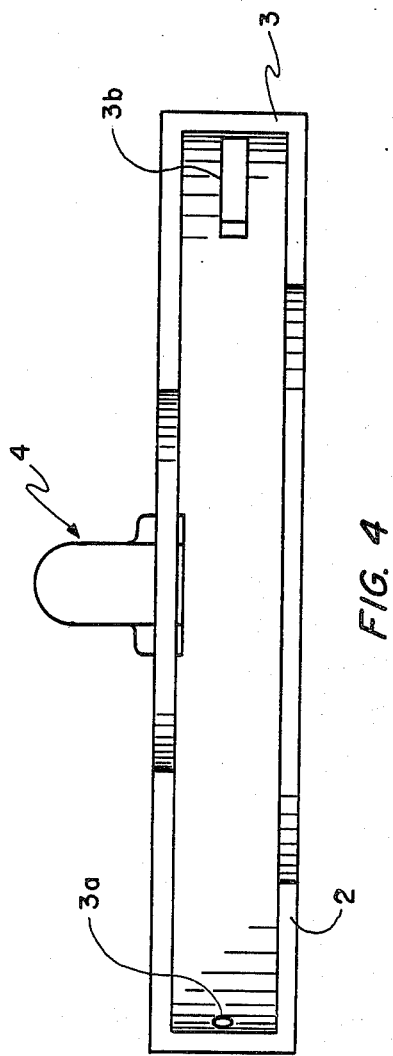
FIG. 4 is a side view of the invention.

This description may be best understood when taken in conjunction with the drawings. The inventive retainer device consists of only five parts, three of which may be unitary. These parts are front and back plates 1 and 2 respectively, side plate 3, cam lever generally designated 4 and cam lever pivot rod 5. As can be seen, each of plates 1 and 2 is in the shape of an arciform slab and is defined by two concentric unequal semicircles joined by segments of the diameter of the greater semicircle. Top plate 1 has opening 1a cut therein and is bored for pivot rod 5. Side plate 3 is arciform and has an outside radius equal to the greater radii of plates 1 and 2. Cam lever 4 has a cam-shaped end 4a and a lever end 4b. Plates 1, 2, and 3 may be machined or otherwise formed as a unitary piece, with 4 and 5 added.

In use, the inventive retainer is placed over the adjusting plate and the flange through which the adjusting shaft passes. It will thus restrain translational movement between the adjusting plate and the flange, but will allow rotational movement therebetween unless cam lever 4 is locked. As shown in the drawing, lever 4 is in its locked position.

Preferably, rod 5 is flexible and provides a bias on 4 to keep it in position when locked. Plate 3 may be drilled as at 3a with a hole for a set-screw into the discussed flange. Moreover, 3 may have a slot, as shown by 3b, in order that one might see circumferential markings on the flange or the adjusting plate.

I claim:
1. A device for retaining against both rotational and translational motion an adjusting plate carried by an axle through a flange, said device including:
a generally arciform body having flat parallel walls or plates each being in the form of an arch defined by concentric unequal semicircles joined by segments of a diameter of the greater semicircle, providing an access to an object retained in said device, an arciform member between the outer semicircles of said walls or plates and orthogonally joined thereto, wherein one of said walls is pierced to define an opening, parallel to said segments, a pivot rod through said one of said walls or plates, parallel to said segments, and traversing said opening, and a cam lever on said rod, with its cam end in said opening.

* * * * *